United States Patent [19]

Brown

[11] 4,080,906
[45] Mar. 28, 1978

[54] SHIPPING BULKHEAD

[75] Inventor: James W. Brown, Dallas, Tex.

[73] Assignee: General Packaging Corporation, Richardson, Tex.

[21] Appl. No.: 728,519

[22] Filed: Oct. 1, 1976

[51] Int. Cl.² .............................................. B60P 7/14
[52] U.S. Cl. ................................ 105/489; 296/24 R; 105/376; 105/498
[58] Field of Search .............. 105/376, 467, 474, 497, 105/498, 499, 489, ; 296/24 R, 24 C, 55; 229/14 C, 14 BE, 15, 23 BT, 27, 42; 220/22

[56] References Cited

U.S. PATENT DOCUMENTS

| 152,004 | 6/1874 | Partridge | 296/55 |
|---|---|---|---|
| 2,530,444 | 11/1950 | Woods | 105/367 |
| 2,808,978 | 10/1957 | Wright et al. | 229/14 C |
| 3,486,468 | 12/1969 | Bezlaj et al. | 105/497 X |
| 3,516,593 | 6/1970 | Larsen | 229/14 C X |

Primary Examiner—Albert J. Makay
Attorney, Agent, or Firm—Richards, Harris & Medlock

[57] ABSTRACT

A bulkhead for installation across a compartment wherein a first multi-ply panel has a narrow flap along one edge, a narrow flap across the top and a narrow partial thickness extension along the edge parallel to one edge. A second multi-ply panel has a narrow flap along one edge, a narrow flap across the top and a narrow partial thickness extension along the edge parallel to the one edge of the second panel. The combined widths of said panels is less than the width of the compartment and the combined widths of the panels plus the widths of the partial thickness extensions is greater than the width of said compartment.

10 Claims, 4 Drawing Figures

SHIPPING BULKHEAD

This invention relates to shielding and separation of discrete quantities of goods during shipment thereof and more particularly to a low cost readily installed reusable weather-resistant bulkhead unit.

In operations involving distribution of dry goods, groceries or the like from a manufacturing plant or central warehouse to retail outlets, orders are made up from different bulk assemblies preparatory to delivery to various ultimate destinations. A given quantity of one type of goods may comprise an order. An assembly of quantities of several different types of goods may make up an order.

Frequently, in one or more of the distribution operations, goods bound for a given destination are in quantity less than the capacity of the delivery vehicle. Several orders often are placed in a vehicle to make up a load. Orders may involve goods all of one general character or may involve goods of widely different character. Delivery may be required to different destinations. Frozen or refrigerated goods often are assigned a given delivery vehicle along with non-frozen goods.

Heretofore bulkheads have been provided for delivery trucks and railroad cars in order to provide stability to a given stack of goods and to provide for separation of different orders. Prior systems have involved complex and expensive structures. Their use could not be justified because of cost and complexity in many of the environments where some sort of bulkhead structure is sorely needed.

The present invention is directed to a relatively simple and inexpensive laminated, weather-resistant bulkhead structure which provides for positive separation and is of sufficient integrity to survive multiple uses thereof.

More particularly, in accordance with the present invention a bulkhead is provided to be installed in a vertical plane in a shipping compartment. It comprises a first multi-ply half panel having a narrow flap along its first side, a narrow flap across the top and a coplanar partial thickness extension along the side opposite the first side.

A second multi-ply half panel has a narrow flap along a first side, a narrow flap along the top and a partial thickness extension along the side of the second panel opposite with the flap folded in the same direction. The two half panels are coplanar and the partial thickness extensions overlap. The sum of the widths of the first and second half panels is less than the width of the shipping compartment by an amount which in turn is less than the width of the partial thickness extensions.

The Novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
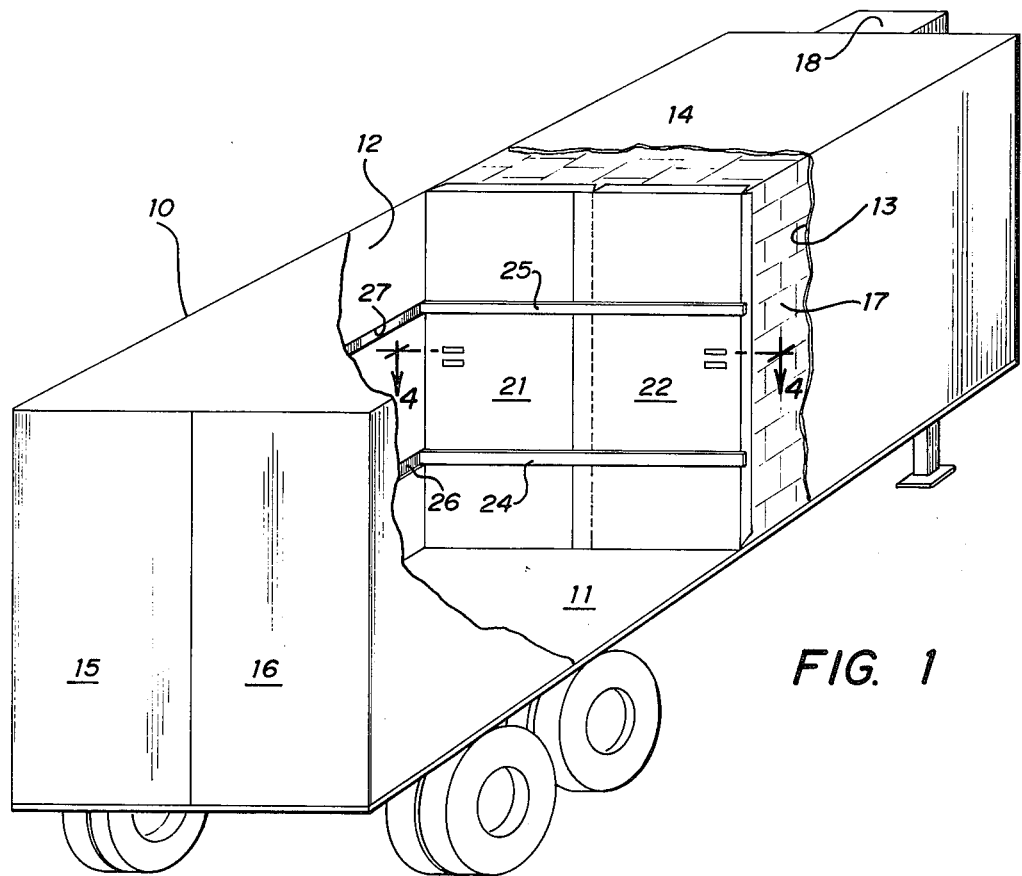
FIG. 1 is an isometric view partially broken away of a semitrailer partially loaded with goods and in which a bulkhead embodying the present invention is installed.

Referring now to FIG. 1, a semitrailer body 10 is of usual construction having a bed 11, side walls 12 and 13 and a roof 14. Doors 15 and 16 are provided for access to the interior of the semi body 10. The body 10 may be refrigerated as to maintain a given temperature for a load of frozen goods 17 which normally would be stacked in the front of body 10 near a source 18 of refrigerated air.

In accordance with the present invention, a bulkhead is provided which is formed of a pair of panels 21 and 22. The panels are made of two laminated layer of triple-walled, weather-resistant, corrugated fiberboard, each layer sheet being about 9/16 inch thick, so as to be individually relatively light in weight, but possessing physical integrity in order to provide an effective physical barrier immediately adjacent the rear of the stack of frozen goods 17.

Figure 2:
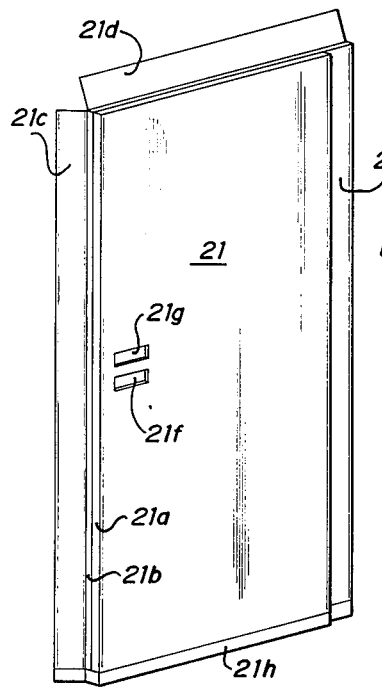
FIG. 2 is an isometric view of the left half panel of FIG. 1.
Figure 3:
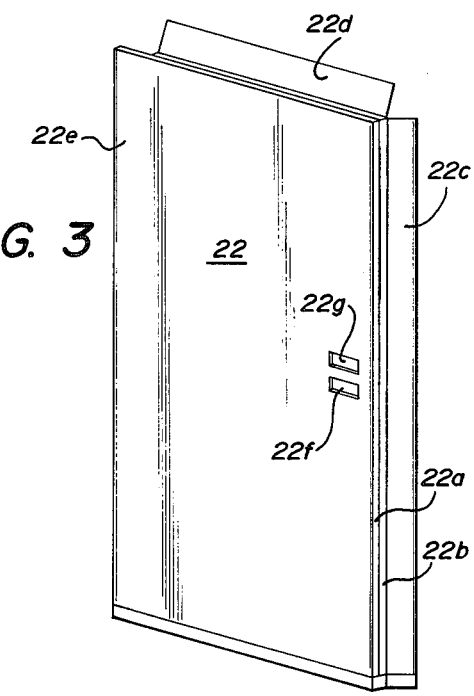
FIG. 3 is an isometric view of the right half panel of FIG. 1.

The construction of panels 21 and 22 is shown in FIGS. 2 and 3, respectively.

In FIG. 2, panel 21 comprises two plys 21a and 21b of triple-walled weather-resistant corrugated fiberboard to which a third weather-resistant, corrugated, singlewall, 400 lb. puncture test ply is adhered. The third ply is greater both in width and height than ply 21b by an amount equal to the width of a relatively narrow edge flap 21c and a relatively narrow top flap 21d, respectively. Preferably, the width of the intermediate ply 21b will be greater than one-half the distance between the inner surfaces of walls 12 and 13 of FIG. 1. At the same time, the width of the rear surface panel 21a will be less than one-half the distance between the inner surfaces of the walls 12 and 13. By this means there is formed a partial thickness extension 21e along the edge of the panel 21 opposite flap 21c.

A pair of spaced horizontally extending recesses 21f and 21g are formed in a rear face of panel 21 at a location about miday the height thereof and substantially closer to the edge from which flap 21c depends than to the edge along which the extension 21e is formed. Recesses 21f and 21g extend through ply 21a only and provide a grip or hand-hold for the left hand as the panel 21 is being installed while the right hand of the operator grasps the edge of the partial thickness extension 21e.

Where the bulkhead is to be used in an environment involving moisture on the bed 11, a waterproof band 21h is applied to cover the bottom of the panel and extend upward along the front end rear sides.

Referring now to FIG. 3, the right hand half panel is formed of a rear triple-walled, weather-resistant corrugated ply 22a and an intermediate triple-walled, weather-resistant corrugated ply 22b. The third ply, a weather-resistant, corrugated singlewall, 400 lb. puncture test ply, is applied to the front surface of panel 22. The width of the rear ply 22a is greater than one-half the distance between the interior surfaces of walls 12 and 13 in FIG. 1. The width of the intermediate ply 22b is less than one-half the distance. By this means a partial thickness extension 22e is formed on the left edge of panel 22. Recesses 22f and 22g extend part way through the panel near the edge along which flap 22c is formed.

With the left bulkhead in place, the operator may then grasp the right bulkhead at the hand hold formed slot recesses 22f and 22g with the right hand grasp. The extension 22e is then grasped with the left hand to move panel 22 into position coplanar with panel 21 and with the partial thickness extensions 21e and 22e overlapping.

Weather-resistant flaps 21c, 21d, 22c and 22d preferably extend forward so that the rear faces of the panels 21 and 22 are unobstructed. In such case staybars 24 and 25 may be secured in latch tracks 26 and 27 on wall 12 and similar tracks along wall 13 to keep bulkhead panels 21 and 22 in place.

With the installation completed as illustrated in FIG. 1, one, two or more additional compartmentalized stacks may be loaded at successively rearward zones in the semibody 10.

Figure 4:
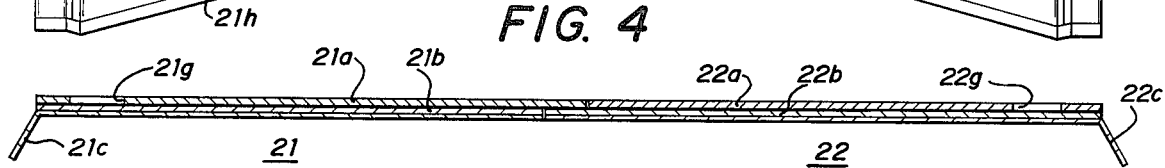
FIG. 4 is a sectional view of the bulkhead of FIG. 1 taken along lines 4—4 thereof.

FIG. 4 illustrates the overlapping relationship between panels 21 and 22. The partial thickness extension 21e is of two-ply thickness and extension 22e is of single-ply thickness. It will be appreciated that the two panels need not be the same width but may be of any selected combination of widths to provide for overlap between the partial thicknesses when installed in a compartment of given width. Panels of equal widths are preferred because they minimize the difficulty in installation. The units are made of three-ply corrugated fiberboard with the corrugations directed horizontally. All glue adhesives used in the bulkhead assembly are of the waterproof type, well known in the art.

What is claimed is:

1. A bulkhead for installation at any selected location across a compartment which comprises:
    (a) a first multi-ply panel having front and rear faces with a narrow integral flap along the left edge, a narrow flap across the top and a narrow partial thickness extension along the right edge;
    (b) a second multi-ply panel having front and rear faces with a narrow integral flap along the right edge, a narrow flap across the top and a narrow partial thickness extension along the left edge;
    (c) said narrow partial thickness extensions overlapping one another to form a smooth integral wall from one side of said compartment to the other, the combined width of said panels being less than the width of said compartment and the combined width of said panels plus said partial thickness extensions being greater than the width of said compartment.

2. The combination set forth in claim 1 wherein said flaps are single ply.

3. The combination set forth in claim 1 wherein a waterproof strip encompasses the bottoms of said panels.

4. The combination set forth in claim 1 wherein said flaps are resiliently hinged to said panels.

5. The combination set forth in claim 1 in which the side and top flaps on said panels are hinged to extend from the front faces in planes perpendicular to the front faces.

6. The combination comprising:
    (a) a compartment;
    (b) a first multi-ply panel having a first narrow hinged edge flap engaging one side of said compartment, a narrow hinged flap across the top engaging the top of said compartment and a narrow partial thickness extension along the panel edge opposite said first edge flap;
    (c) a second multi-ply panel in the same plane as said first panel having a second narrow hinged edge flap engaging the side of said compartment opposite said first edge flap, a narrow hinged flap across the top engaging the top of said compartment and a narrow partial thickness extension along the panel edge opposite said second edge flap;
    (d) said narrow partial thickness extensions overlapping one another to form a smooth integral wall from one side of said compartment to the other, the combined widths of said panels being less than the width of said compartment and the combined widths of said panels plus the widths of said partial thickness extensions being greater than the width of said compartment so that said partial thickness extensions overlap and form a substantially continuous bulkhead across said compartment at said plane.

7. The combination of claim 1 in which at least one rigid member extends across said compartment to support said bulkhead on the side thereof opposite the direction said flaps extend away from said plane.

8. A bulkhead for installation across a compartment which comprises:
    (a) a first multi-ply panel having a narrow flap along one edge, a narrow flap across the top and a narrow partial thickness extension along the edge parallel to said one edge;
    (b) a second multi-ply panel having a narrow flap along one edge, a narrow flap across the top and a narrow partial thickness extension along the edge parallel to said one edge of said second panel;
    (c) said first and second multi-ply panels each having:
        a first layer sheet of predetermined width and height dimensions;
        a second layer sheet having a height dimension equal to that of the first layer sheet and a width dimension different from that of the first layer sheet to form the partial thickness extension; and
        a third layer sheet greater in width than the second layer sheet by an amount equal to the width of the narrow edge flap and greater in height than the second layer sheet by an amount equal to the width of the narrow top flap.

9. The combination comprising:
    (a) a compartment;
    (b) a first multi-ply panel having a first narrow edge flap engaging one side of said compartment, a narrow flap across the top engaging the top of said compartment and a narrow partial thickness extension along the panel edge opposite said first edge flap;
    (c) a second multi-ply panel in the same plane as said first panel having a second narrow edge flap engaging the side of said compartment opposite said first edge flap, a narrow flap across the top engaging the top of said compartment and a narrow partial thickness extension along the panel edge opposite said second edge flap; and
    (d) said first and second multi-ply panels each having:
        a first layer sheet of predetermined width and height dimensions;
        a second layer sheet having a height dimension equal to that of the first layer sheet and a width dimension different from that of the first layer sheet to form the partial thickness extension; and
        a third layer sheet greater in width than the second layer sheet by an amount equal to the width of the narrow edge flap and greater in height than the second layer sheet by an amount equal to the width of the narrow top flap.

10. The combination comprising:
    (a) a compartment;

(b) a first multi-ply panel having a first narrow edge flap engaging one side of said compartment and a narrow partial thickness extension along the panel edge opposite said first edge flap;

(c) a second multi-ply panel in the same plane as said first panel having a second narrow edge flap engaging the side of said compartment opposite said first edge flap and a narrow partial thickness extension along the panel edge opposite said second edge flap;

(d) the combined widths of said panels being less than the width of said compartment and the combined widths of said panels plus the widths of said partial thickness extensions being greater than the width of said compartment so that said partial thickness extensions overlap and form a substantially continuous bulkhead across said compartment at said plane; and (e) said first and second multi-ply panels each having:
 a first layer sheet of predetermined width and height dimensions;
 a second layer sheet having a height dimension equal to that of the first layer sheet and a width dimension different from that of the first layer sheet to form the partial thickness extension; and
 a third layer sheet greater in width than the second layer sheet by an amount equal to the width of the narrow edge flap and greater in height than the second layer sheet by an amount equal to the width of the narrow top flap.

* * * * *